E. S. STOTTS.
ECCENTRIC STEAM HOSE LOCK.
APPLICATION FILED APR. 20, 1914.
1,130,855.
Patented Mar. 9, 1915.
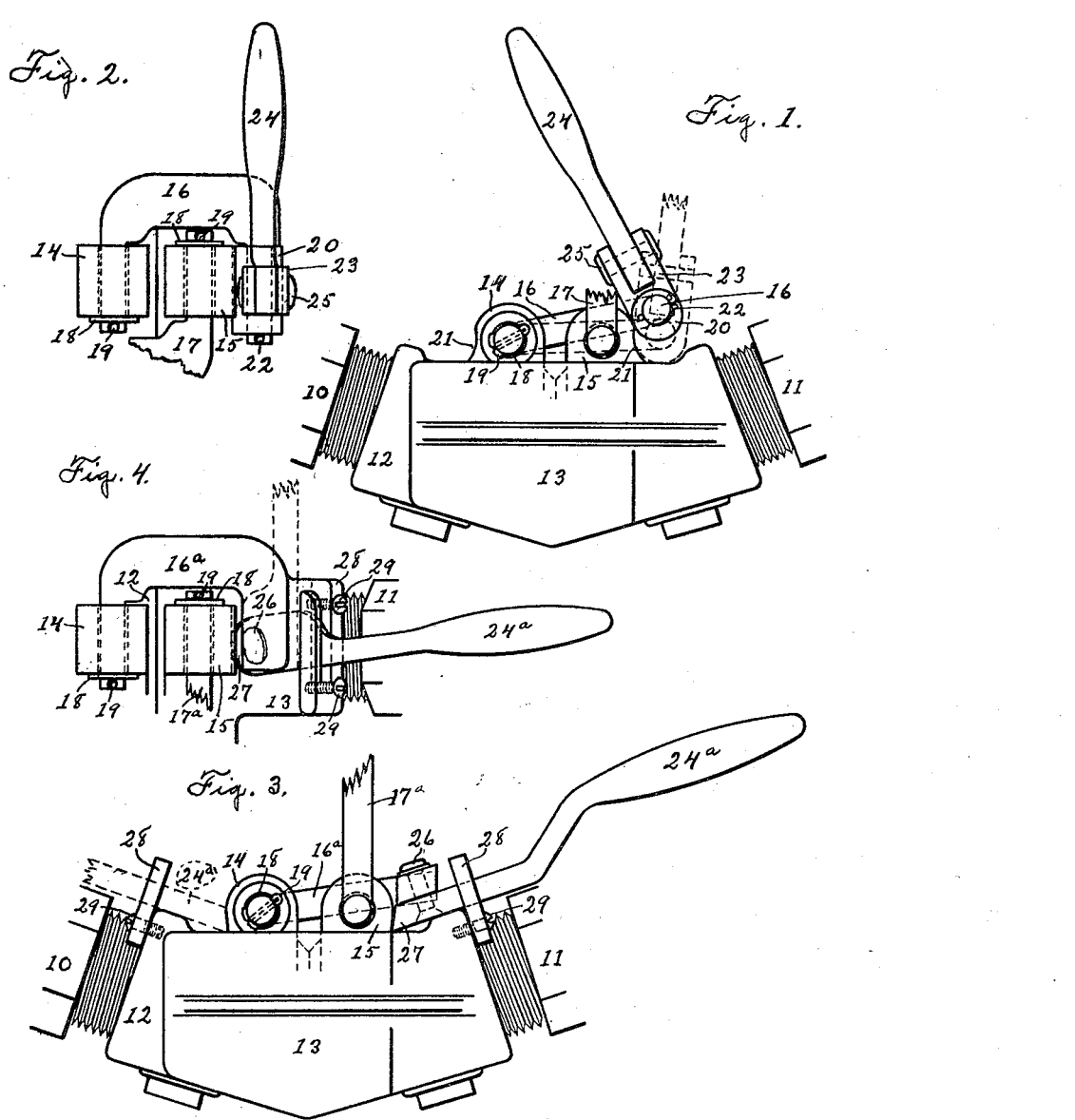
Witnesses:
Inventor
ELZA S. STOTTS
By Earl M. Sinclair
Atty.

UNITED STATES PATENT OFFICE.

ELZA S. STOTTS, OF DES MOINES, IOWA.

ECCENTRIC STEAM-HOSE LOCK.

1,130,855.  Specification of Letters Patent.  Patented Mar. 9, 1915.

Application filed April 20, 1914. Serial No. 833,810.

*To all whom it may concern:*

Be it known that I, ELZA S. STOTTS, citizen of the United States of America, and resident of Des Moines, Polk county, Iowa, have invented a new and useful Eccentric Steam-Hose Lock, of which the following is a specification.

The object of this invention is to provide improved means for connecting abutting steam-hose heads employed between railway passenger cars.

A further object of this invention is to provide an improved construction for steam-hose locks.

My invention consists in the construction, arrangement and combination of elements hereinafter set forth, pointed out in my claims and illustrated by the accompanying drawing, in which—

Figure 1 is a side elevation illustrating one form of my improved steam-hose lock. Fig. 2 is a plan of a portion of the same. Fig. 3 is a side elevation of a modified form, and Fig. 4 is a plan of the same.

In the construction and application of my improvement according to Figs. 1 and 2, known as the vertical eccentric, the numerals 10, 11 designate couplings mounted on end portions of hose members (not shown) on adjacent railway cars, said hose members forming part of the steam radiation equipment. The couplings 10, 11 carry hose heads 12, 13 respectively of common form, adapted to be mounted and secured relative to each other in such manner as to form a steam-tight joint between the hose ends. The hose heads 12, 13 are formed on their tops with transverse lugs or bearings 14, 15 respectively, adapted to be brought into adjacent and parallel relations when said heads are connected. Yoke-shaped links 16, 17 are provided for the bearing lugs 14, 15 and are formed with pivots on one end each journaled in the respective bearing lugs. The yoke-shaped links 16, 17 are secured against withdrawal from the respective bearings by means of washers 18 and split-keys 19. Each yoke-shaped link 16, 17 is adapted to swing over and to embrace the bearing lug 15 or 14 opposite to its pivotal mounting, and has its free leg formed as a pivot on which is mounted an eccentric clamp 20, one only of which is shown. It is to be understood that each hose head 12, 13 preferably is formed with the complete locking devices, although I have here shown only one complete set, those connected to the head 13 being broken away to economize space and avoid confusion. The eccentric clamp 20 is adapted to engage the outer face of the lug 14 (or 15), each lug being formed with a curved seat 21 for its reception, and to apply strain thereto to the end of tightly and securely joining the hose heads 12, 13. The eccentric clamp 20 is secured on the pivot of the link 16 (or 17) by means of a split-key 22. The eccentric clamp 20 is formed with a bifurcated lug 23 extending in the direction opposite to its clamping surface, and a handle 24 has one end mounted in the fork of said lug and secured to a pivot bolt 25, extending at right angles to the pivot of the link and clamp.

In use the hose heads are brought together and the handle 24 is grasped and manipulated to cause the link 16 to swing over the lug 15, after which said handle is used as a lever, and in alinement with the bifurcated lug 23, to cause the eccentric clamp 20 to engage the outer face of the lug 15 and lock in the seat 21 thereof, the parts then occupying the position indicated by the dotted lines in Fig. 1. The handle 24 may then be turned laterally on the pivot 25 to position shown in Fig. 2, where it is out of the way until again wanted for unseating the clamp 20, which is accomplished by an opposite movement of said handle.

In the construction according to Figs. 3 and 4, known as the horizontal eccentric, the links 16$^a$, 17$^a$ are not formed with pivots on their free ends but are formed flat. A handle lever 24$^a$ is pivoted adjacent its end on a vertical axis to the free end of the link 16$^a$ (or 17$^a$), by means of a bolt or rivet 26. The handle lever 24$^a$ projects somewhat beyond the pivot 26 and is formed with an eccentric clamp 27 adapted to engage the rear face of the bearing lug 15 (or 14). The handle end of the lever 24$^a$ preferably is offset upwardly to avoid contact with the coupling 11 and hose connected thereto. A keeper 28 is secured to the base end of each hose head 12, 13, as by screws 29, and is designed to receive the handle lever 24$^a$, when the parts are in locking position, and prevent upward movement thereof and of the clamp 27 and link 16$^a$ (or 17$^a$). The handle lever 24$^a$ is seated in the keeper 28 by lateral movement, articulating on the pivot 26, in the act of seating the eccentric clamp 27. An opposite movement of the lever 24$^a$ has the effect of unseating from the keeper 28 and releasing the clamp.

It is to be understood that a locking device preferably is employed for each hose head, for engagement with the other hose head.

This device provides a secure and positive lock for the hose heads, which is easy of manipulation and simple of construction. It forms a steam-tight joint between the hose ends, and prevents all chafing and wearing of the gaskets of the hose heads.

I claim as my invention—

1. A steam-hose lock, comprising spaced lugs, one of said lugs having a transverse bearing, a yoke-shaped link having its legs formed as pivots, one of said pivots being journaled in said bearing, an eccentric clamp journaled on the opposite pivot of said link, said clamp being forked at its outer end, and a handle pivoted in the fork of said eccentric clamp.

2. A steam-hose lock, comprising spaced lugs, one of said lugs having a transverse bearing, a yoke-shaped link having its legs formed as pivots, one of said pivots being journaled in said bearing, an eccentric clamp journaled on the opposite pivot and adapted to engage the outer face of said other lug, and a handle pivoted on said clamp, the pivoting of said handle being at right angles to the pivoting of said clamp.

Signed by me at Des Moines, Iowa, this 27" day of March, 1914.

ELZA S. STOTTS.

Witnesses:
B. O. LYNN,
EARL M. SINCLAIR.

Copies of this patent may be obtained for five cents each, by addressing the "Commissioner of Patents, Washington, D. C."